United States Patent
Castinado et al.

(10) Patent No.: US 12,333,654 B2
(45) Date of Patent: Jun. 17, 2025

(54) SYSTEM AND METHOD FOR GENERATING A DIGITAL RENDITION OF A LOCATION TO RECREATE A USER INTERACTION IN A DIGITAL ECOSYSTEM

(71) Applicant: BANK OF AMERICA CORPORATION, Charlotte, NC (US)

(72) Inventors: Joseph Benjamin Castinado, North Glenn, CO (US); Hope Barus, Fort Mill, SC (US); Cyril Prabhu, Waxhaw, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 239 days.

(21) Appl. No.: 18/073,997

(22) Filed: Dec. 2, 2022

(65) Prior Publication Data
US 2024/0185533 A1 Jun. 6, 2024

(51) Int. Cl.
| | |
|---|---|
| G06T 19/00 | (2011.01) |
| H04W 4/02 | (2018.01) |
| G06F 3/01 | (2006.01) |
| H04N 21/00 | (2011.01) |

(52) U.S. Cl.
CPC ............ *G06T 19/003* (2013.01); *H04W 4/02* (2013.01); *G06F 3/011* (2013.01); *H04N 21/00* (2013.01)

(58) Field of Classification Search
None
See application file for complete search history.

(56) References Cited

U.S. PATENT DOCUMENTS

| | | | |
|---|---|---|---|
| 6,266,068 B1 | 7/2001 | Kang et al. | |
| 8,365,075 B2 | 1/2013 | Bhogal et al. | |
| 8,645,230 B2 | 2/2014 | Oliver et al. | |
| 9,105,014 B2 | 8/2015 | Collet et al. | |
| 9,392,212 B1 | 7/2016 | Ross | |
| 10,332,311 B2 | 6/2019 | Davis et al. | |
| 10,732,706 B2 | 8/2020 | Eronen et al. | |
| 10,803,652 B2 | 10/2020 | Ohba et al. | |
| 10,926,184 B2 * | 2/2021 | Lucas | A63F 13/77 |

(Continued)

FOREIGN PATENT DOCUMENTS

| | | |
|---|---|---|
| EP | 3850470 B1 | 11/2022 |
| WO | 2008124941 A1 | 10/2008 |
| WO | 2019034804 | 2/2019 |

*Primary Examiner* — Saptarshi Mazumder
(74) *Attorney, Agent, or Firm* — Moore & Van Allen PLLC; Anoohya Yarlagadda (57) ABSTRACT

Embodiments of the present invention provide a system for generating digital rendition of a location to recreate a user interaction in a digital ecosystem. The system is configured for receiving an input associated with a resource interaction from a user, determining a third party entity and a third party entity location associated with the resource interaction, extracting one or more audio files associated with the third party entity and the third party entity location, extracting one or more video files associated with the third party entity and the third party entity location, instantaneously generating a digital rendition of the third party entity location based on the one or more audio files and the one or more video files in a digital ecosystem, and allowing the user to recreate a user interaction associated with the resource interaction in the digital ecosystem.

14 Claims, 5 Drawing Sheets

(56) References Cited

U.S. PATENT DOCUMENTS

| | | | |
|---|---|---|---|
| 10,970,932 B2 | 4/2021 | Leppanen et al. | |
| 11,099,802 B2 | 8/2021 | Eronen et al. | |
| 11,430,178 B2 | 8/2022 | Pystynen et al. | |
| 11,431,901 B2 | 8/2022 | Van Hoff et al. | |
| 11,488,355 B2 | 11/2022 | Davis et al. | |
| 2009/0161963 A1 | 6/2009 | Uusitalo et al. | |
| 2012/0050570 A1* | 3/2012 | Jasinski | H04N 23/00 348/231.4 |
| 2012/0133638 A1 | 5/2012 | Davison et al. | |
| 2014/0359656 A1* | 12/2014 | Banica | H04N 21/234 725/32 |
| 2018/0095635 A1 | 4/2018 | Valdivia et al. | |
| 2019/0130644 A1 | 5/2019 | Mate et al. | |
| 2021/0327157 A1* | 10/2021 | Cuthbertson | G06Q 30/00 |

* cited by examiner

SYSTEM AND METHOD FOR GENERATING A DIGITAL RENDITION OF A LOCATION TO RECREATE A USER INTERACTION IN A DIGITAL ECOSYSTEM

BACKGROUND

There exists a need for a system for generating digital rendition of a location to recreate a user interaction in a digital ecosystem.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of embodiments in a summary form as a prelude to the more detailed description that follows.

Embodiments of the present invention address the above needs and/or achieve other advantages by providing apparatuses (e.g., a system, computer program product and/or other devices) and methods for generating digital rendition of a location to recreate a user interaction in a digital ecosystem. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives an input associated with a resource interaction from a user, determines a third party entity and a third party entity location associated with the resource interaction, extracts one or more audio files associated with the third party entity and the third party entity location, extracts one or more video files associated with the third party entity and the third party entity location, instantaneously generates a digital rendition of the third party entity location based on the one or more audio files and the one or more video files in a digital ecosystem, and allows the user to recreate a user interaction associated with the resource interaction in the digital ecosystem.

In some embodiments, the present invention determines a time stamp associated with the resource interaction.

In some embodiments, the present invention extracts the one or more audio files and the one or more video files associated with the time stamp.

In some embodiments, the present invention captures audio associated with the third party entity and the third party entity location to store in the one or more audio files and captures video associated with the third party entity and the third party entity location to store in the one or more video files.

In some embodiments, the present invention allows the user to identify one or more resources associated with the resource interaction while recreating the user interaction in the digital ecosystem.

In some embodiments, the present invention allows the user to return or exchange at least one resource of the one or more resources after recreation of the user interaction.

In some embodiments, the present invention displays additional resources in the digital ecosystem while the user is recreating the user interaction.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, a digital ecosystem is a hypothetical iteration of the Internet as a single, universal and immersive virtual environment that is facilitated by the use of virtual reality and augmented reality devices. Thus, digital ecosystem provides the ability for a user to associate with an avatar (i.e., a virtual representation/object of the user) and for the avatar to perform one or more actions (e.g., resource exchange events, purchase of products, or the like) within a virtual environment. An example of such a digital ecosystem is a Metaverse.

As described herein, the term "entity" may be any entity registered on a Metaverse to conduct one or more operations. In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution such as an auto dealer, retail store, department store, pharmacy, hospital, or the like.

Many of the example embodiments and implementations described herein contemplate interactions engaged in by a user with a computing device and/or one or more communication devices and/or secondary communication devices. A "user", as referenced herein, may refer to a customer of the entity. In some embodiments, the term "user" may refer to a potential customer of the entity. Furthermore, as used herein, the term "user computing device" or "mobile device" may refer to augmented reality devices, virtual reality devices, mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Figure 1:
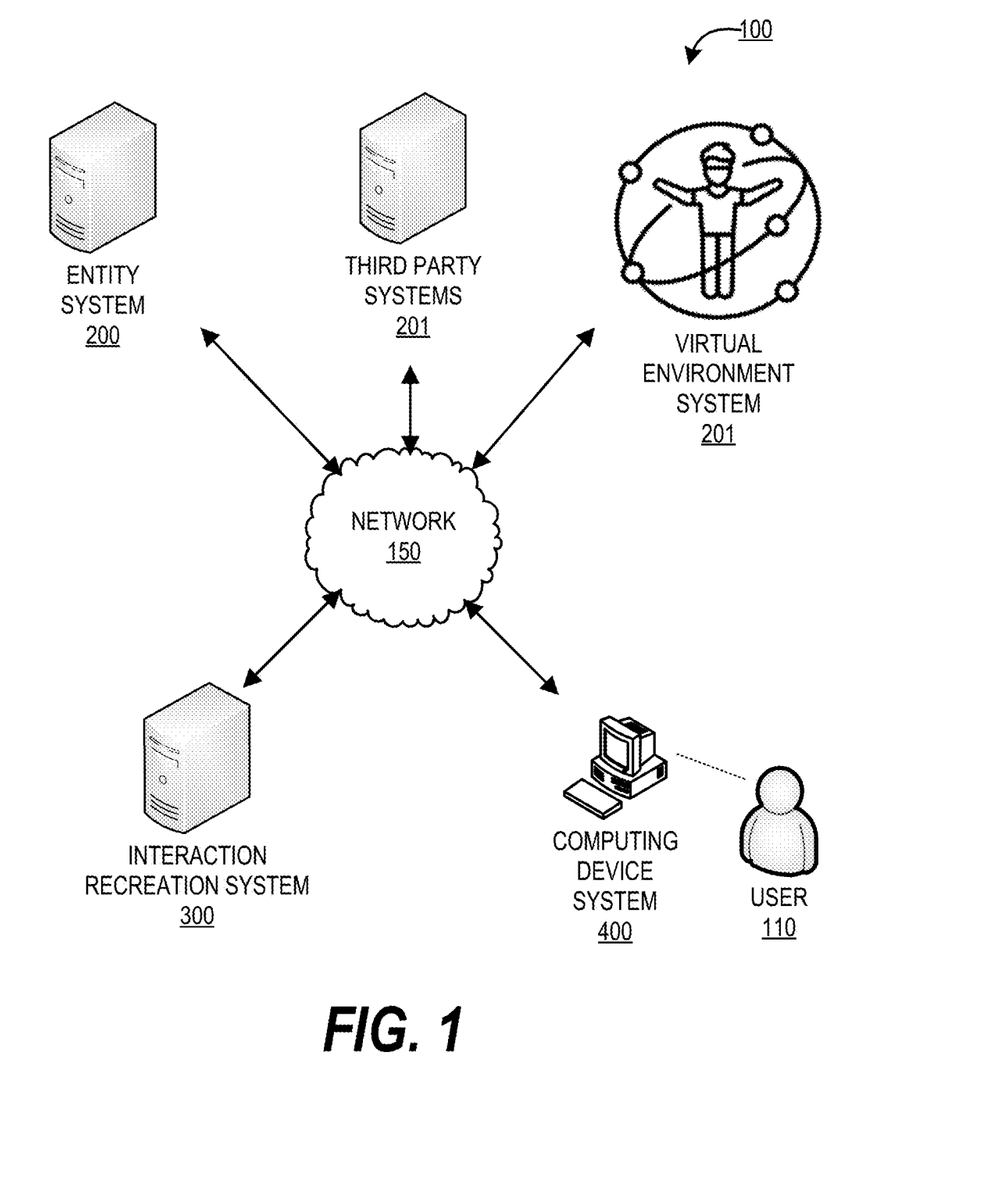
FIG. 1 provides a block diagram illustrating a system environment for generating digital rendition of a location to recreate a user interaction in a digital ecosystem, in accordance with an embodiment of the invention.

FIG. 1 provides a block diagram illustrating a system environment 100 for generating digital rendition of a location to recreate a user interaction in a digital ecosystem, in accordance with an embodiment of the invention. As illustrated in FIG. 1, the environment 100 includes an interaction recreation system 300, an entity system 200, one or more third party systems 201, a computing device system 400, and a virtual environment system 201. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more users 110 may be potential customers of the entity associated with the entity system 200. In some embodiments, the one or more users 110 may be users of the virtual environment system 201. In some embodiments, the one or more users 110 may be users of other entities (e.g., other financial institutions).

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that is part of a digital universe, such as a Metaverse. In some embodiments, the one or more third party systems 201 may be any third party entities (e.g., merchants) that provide one or more services, products, goods, or the like to the one or more users 110. In some such embodiments, the third party entities may be customers of the entity, where the entity manages one or more resource pools (e.g., business accounts) of the third party entities.

The virtual environment system 201 may be one or more systems that provide access to one or more digital ecosystems associated with one or more entities and also maintain and manage the one or more digital ecosystems associated with the one or more entities. In some embodiments, the virtual environment system 201 may be a part of the entity system 200, where the entity system 200 provides access, manages, maintains, controls, and/or the like a digital ecosystem associated with the entity. As such, there may be multiple systems and/or virtual environment systems associated with the other entities and third party entities that have digital ecosystems set up in the virtual environment.

The interaction recreation system 300 is a system of the present invention for performing one or more process steps described herein. In some embodiments, the interaction recreation system 300 may be an independent system. In some embodiments, the interaction recreation system 300 may be a part of the entity system 200. In some embodiments, the interaction recreation system 300 may be controlled, owned, managed, and/or maintained by the entity associated with the entity system 200.

The interaction recreation system 300, the entity system 200, the computing device system 400, the one or more capturing devices 301, and the virtual environment system 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the interaction recreation system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the interaction recreation system 300, and/or entity system 200 across the network 150. In some exemplary embodiments of the invention, the computing device system 400 may be Virtual Reality glasses, virtual reality headsets, a desktop computer, smartphone, Augmented Reality glasses, Virtual Reality gloves, wrist-based bands, and/or any other devices used to access a digital universe.

Figure 2:
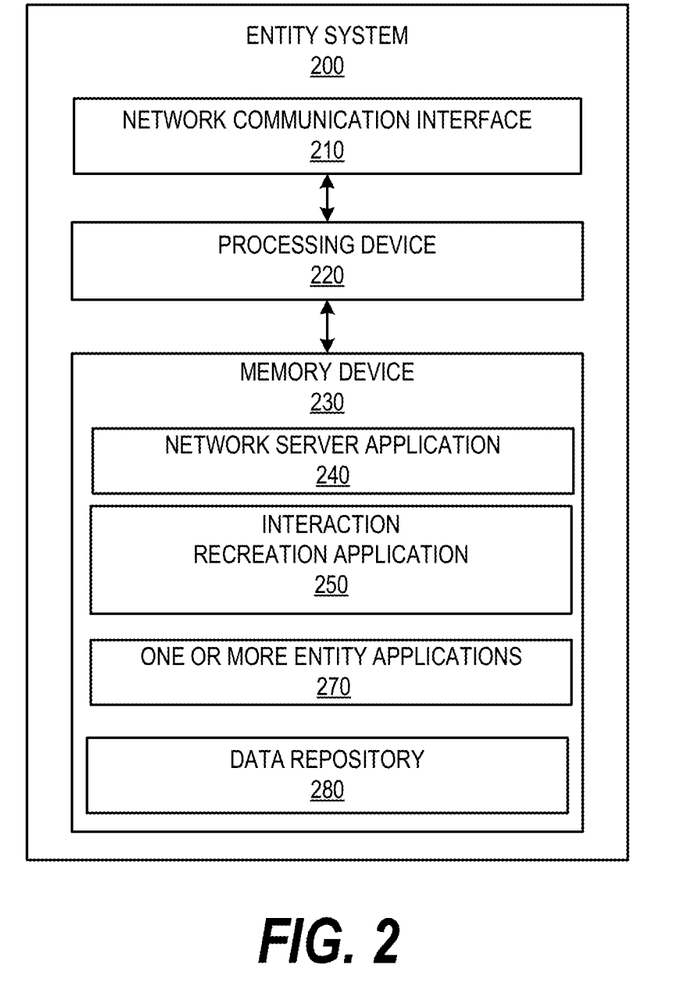
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an interaction recreation application 250, one or more entity applications 270, and a data repository 280 comprising historical transaction data, historical product level data associated with one or more transactions performed by the users, and the like. The one or more entity applications 270 may be any applications developed, supported, maintained, utilized, and/or controlled by the entity. The computer-executable program code of the network server application 240, the interaction recreation application 250, the one or more entity application 270 to perform certain logic, data-extraction, and data-storing functions of the entity system 200 described herein, as well as communication functions of the entity system 200.

The network server application 240, the interaction recreation application 250, and the one or more entity applications 270 are configured to store data in the data repository 280 or to use the data stored in the data repository 280 when communicating through the network communication interface 210 with the interaction recreation system 300, and/or the computing device system 400 to perform one or more process steps described herein. In some embodiments, the entity system 200 may receive instructions from the interaction recreation system 300 via the interaction recreation application 250 to perform certain operations. The interaction recreation application 250 may be provided by the interaction recreation system 300. The one or more entity applications 270 may be any of the applications used, created, modified, facilitated, developed, and/or managed by the entity system 200.

Figure 3:
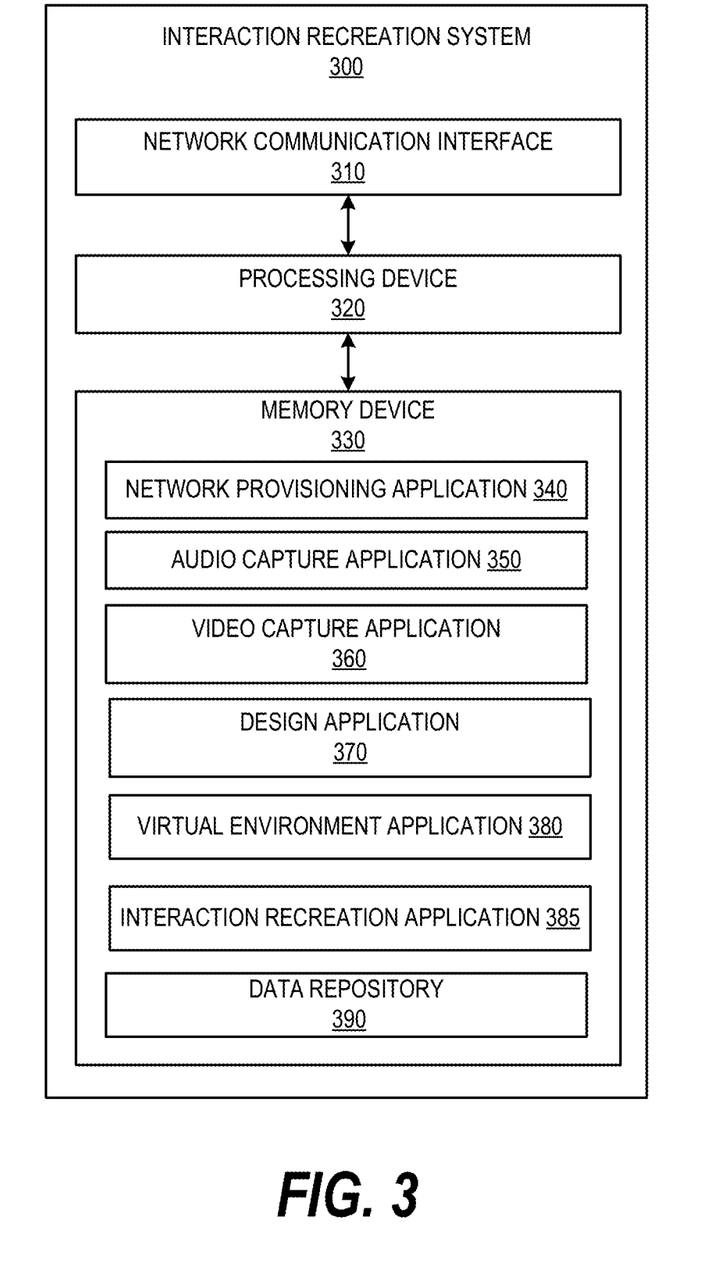
FIG. 3 provides a block diagram illustrating an interaction recreation system 300 of FIG. 1, in accordance with an embodiment of the invention.

FIG. 3 provides a block diagram illustrating the interaction recreation system 300 in greater detail, in accordance with embodiments of the invention. As illustrated in FIG. 3, in one embodiment of the invention, the interaction recreation system 300 includes one or more processing devices 320 operatively coupled to a network communication interface 310 and a memory device 330. In certain embodiments, the interaction recreation system 300 is operated by an entity, such as a financial institution. In other embodiments, the interaction recreation system 300 is operated by a non-financial institution. In some embodiments, the interaction recreation system 300 is owned or operated by the entity of the entity system 200. In some embodiments, the interaction recreation system 300 may be an independent system. In alternate embodiments, the interaction recreation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the interaction recreation system 300 described herein. For example, in one embodiment of the interaction recreation system 300, the memory device 330 includes, but is not limited to, a network provisioning application 340, an audio capture application 350, a video capture application 360, a design application 370, a virtual environment application 380, an interaction recreation application 385, and a data repository 390 comprising any data processed or accessed by one or more applications in the memory device 330. The computer-executable program code of the network provisioning application 340, the audio capture application 350, the video capture application 360, the design application 370, the virtual environment application 380, and the interaction recreation application 385 may instruct the processing device 320 to perform certain logic, data-processing, and data-storing functions of the interaction recreation system 300 described herein, as well as communication functions of the interaction recreation system 300.

The network provisioning application 340, the audio capture application 350, the video capture application 360, the design application 370, the virtual environment application 380, and the interaction recreation application 385 are configured to invoke or use the data in the data repository 390 when communicating through the network communication interface 310 with the entity system 200, and/or the computing device system 400. In some embodiments, the network provisioning application 340, the audio capture application 350, the video capture application 360, the design application 370, the virtual environment application 380, and the interaction recreation application 385 may store the data extracted or received from the entity system 200, and the computing device system 400 in the data repository 390. In some embodiments, the network provisioning application 340, the audio capture application 350, the video capture application 360, the design application 370, the virtual environment application 380, and the interaction recreation application 385 may be a part of a single application (e.g., modules).

Figure 4:
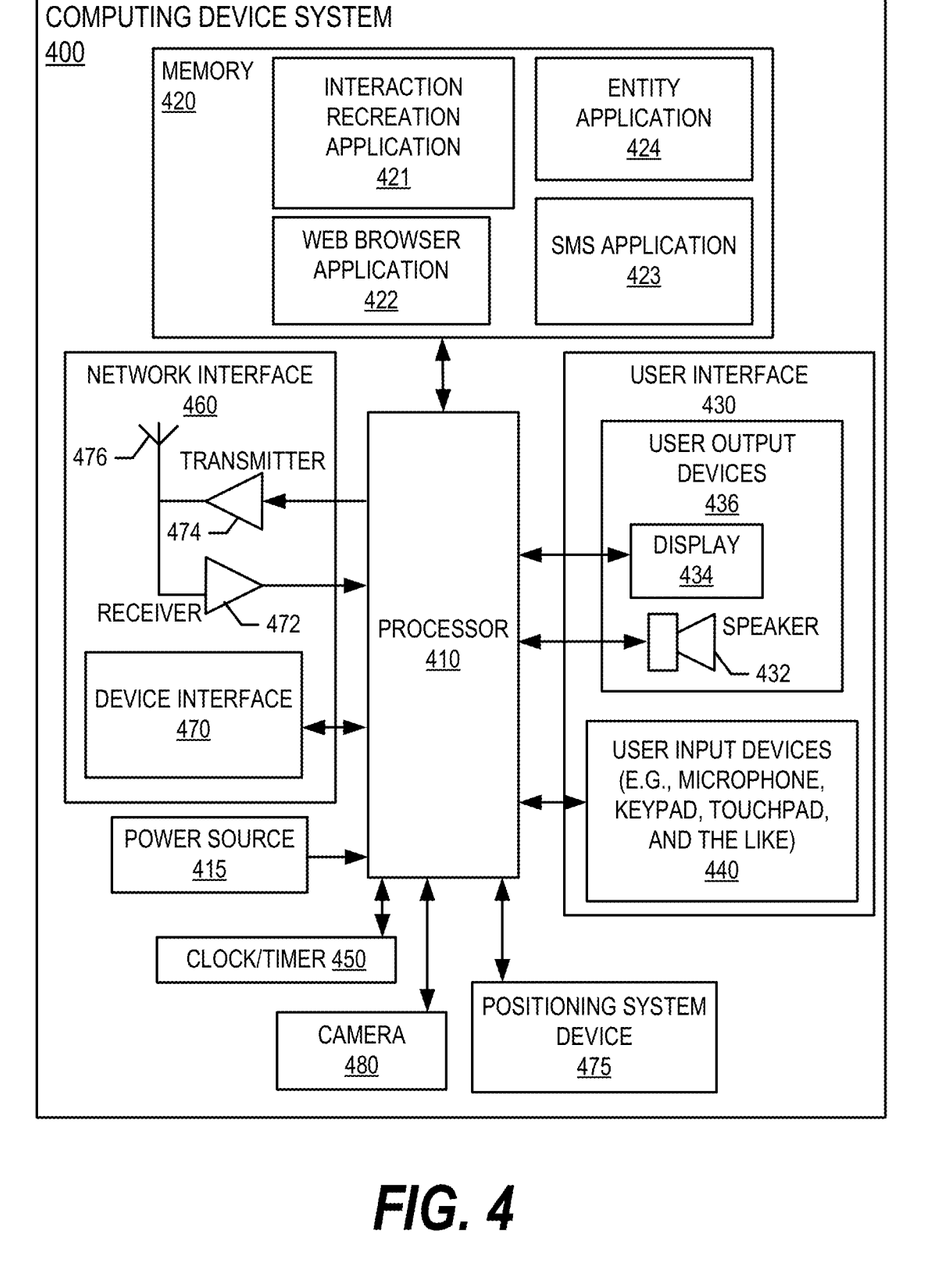
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an interaction recreation application 421, entity application 424. These applications also typically provide instructions to a graphical user interface (GUI) on the display 430 that allows the user 110 to interact with the entity system 200, the interaction recreation system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the interaction recreation application 421 provided by the interaction recreation system 300 allows the user 110 to access the interaction recreation system 300. In some embodiments, the entity application 424 provided by the entity system 200 and the interaction recreation application 421 allow the user 110 to access the functionalities provided by the interaction recreation system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
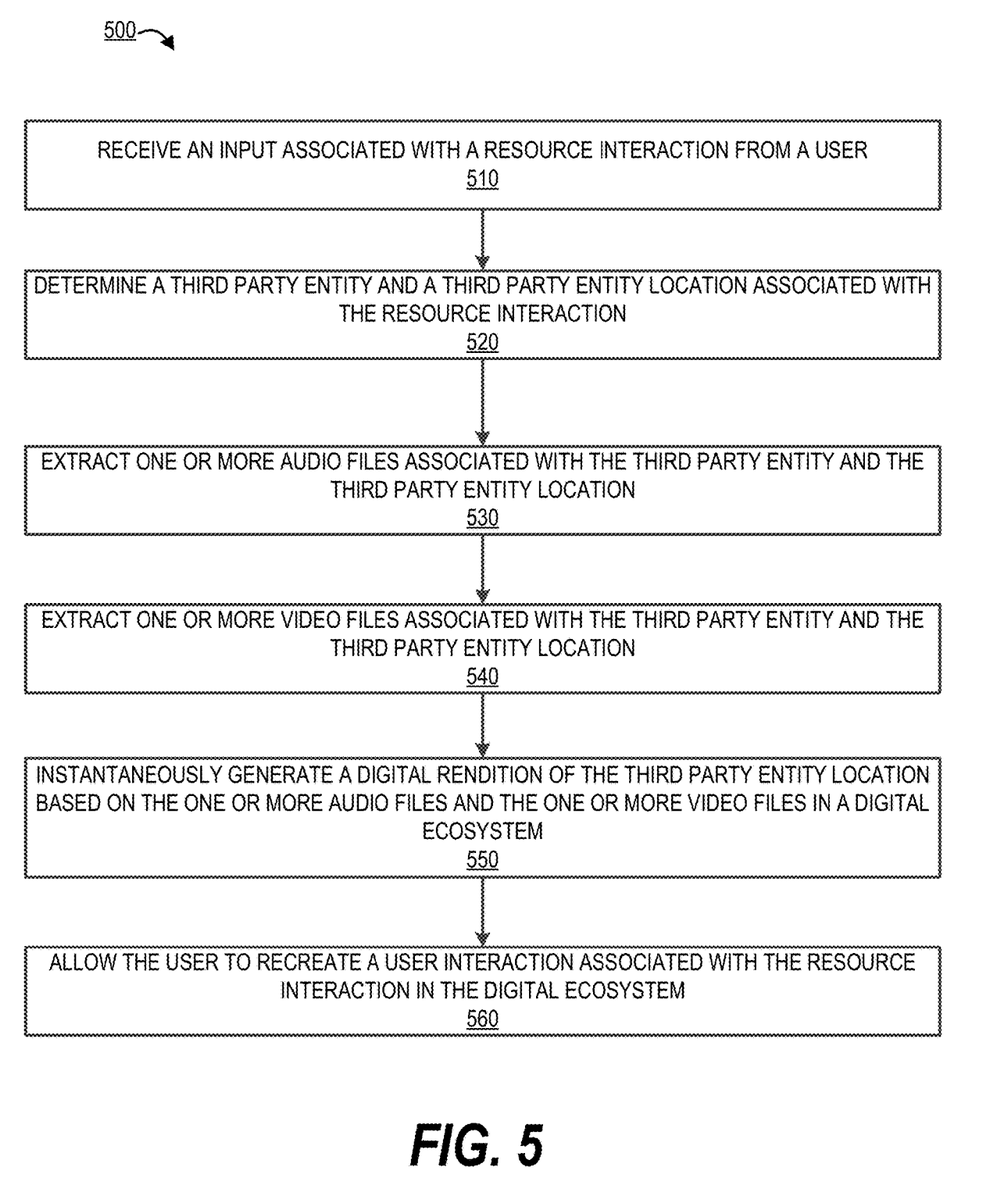
FIG. 5 provides a process flow for generating digital rendition of a location to recreate a user interaction in a digital ecosystem, in accordance with an embodiment of the invention.

FIG. 5 provides a process flow for generating digital rendition of a location to recreate a user interaction in a digital ecosystem, in accordance with an embodiment of the invention. As shown in block 510, the system receives an input associated with a resource interaction from a user. The input may be a support request associated with the resource interaction. In some embodiments, the user may provide the input via an entity application, where the entity application displays one or more resource interactions performed by the user. For example, an online banking application provided by a financial institution may display all financial transactions associated with the user. The user may look at a financial transaction and may have difficulty remembering the financial transaction and resources (e.g., products, goods, services) associated with the financial transaction. In such cases, the user may submit a request, via the online banking application, for support to know more information about the financial transaction.

As shown in block 520, the system determines a third party entity and a third party entity location associated with the resource interaction. The system may determine the third party entity and the third party entity location based on a resource interaction record received by the entity, where the resource interaction record may comprise a location identifier, a third party identifier, or the like. For example, the system may determine that the resource interaction is associated with a multinational retail store at a location 'A'. In another example, the system may determine that the resource interaction is associated with a restaurant. In another example, the system may determine that the resource interaction is associated with a grocery store.

As shown in block 530, the system extracts one or more audio files associated with the third party entity and the third party entity location. As shown in block 540, the system extracts one or more video files associated with the third party entity and the third party entity location. The system may be configured to capture audio and video associated with the third party entity and the third party entity location via one or more audio and video capturing devices present at the third party location, where the third party entity may be a customer of the system and/or the entity. The system may then store the captured audio in the one or more audio files and the captured video in the one or more video files. In some embodiments, capturing of the audio and video may be performed by the system at regular intervals. In some embodiments, the system may capture the audio and video every day in the morning. In some embodiments, the system may capture the audio and video when the third party entity location does not have any customers or employees. In some embodiments, where the system captures the audio and video while other customers or employees are present at the third party entity location, the system may delete a portion of the audio/video where the customers or employees are captured and may store other portions of the audio and video in the one or more audio files and the one or more video files. In some embodiments, the system may identify a time stamp associated with the resource interaction from the resource interaction record and may extract the one or more audio files and the one or more video files associated with the time stamp. In some embodiments, the system may determine a date associated with the resource interaction from the resource interaction record and may extract the one or more audio files and the one or more video files associated with the date. For example, the system may extract the audio files and video files associated with the data to identify information associated with the products that were available at the third party entity location on that date.

As shown in block 550, the system instantaneously generates a digital rendition of the third party entity location based on the one or more audio files and the one or more video files in a digital ecosystem. The system may instantaneously design the digital rendition of the third party entity using the one or more audio files and the one or more video files and may package the design and transmit it to a virtual environment system for integration into the digital ecosystem. Upon integration of the design, the user may access the digital rendition via one or more user devices (e.g., virtual glasses or the like) in the digital ecosystem. In some embodiments, the system may design the digital rendition based on a generic layout associated with the third party entity. For example, if the third party entity is a multinational retail corporation with multiple retail stores at different locations, such stores may have the same layout. The system may initiate the design with the generic layout associated with the multinational retail corporation.

As shown in block 560, the system allows the user to recreate a user interaction associated with the resource interaction in the digital ecosystem. The system may allow the user to virtually walk in the digital rendition of the third party entity location to recreate the user interaction associated with the resource interaction and identify one or more resources associated with the resource interaction based on recreation of the user interaction. For example, the user may walk through a retail store in the digital ecosystem to recreate the interaction and identify the purchased products that are associated with the financial transaction. This allows the user to remember and recreate the interaction without any effort. In some embodiments, the system may also allow the user to return and/or exchange at least one resource of the one or more resources in the digital ecosystem. In some embodiments, the system may provide additional resources while the user is recreating the user interaction or after recreation of the user interaction. In some embodiments, the system may generate different levels or layers of digital renditions and may instantaneously display the different levels of digital renditions based on activity of the user in the digital ecosystems and/or user preferences. For example, the system may initially display a high level digital rendition comprising the generic layout of a merchant store and may instantaneously provide additional layer of digital rendition associated with an aisle inside the merchant store based on determining that the user is walking into the aisle.

In another example, the system may allow a user to recreate an interaction at a restaurant, where the system may generate a digital rendition of the restaurant. In some instances, the system may also provide additional information associated with other users who dined with the user at the restaurant at the time of the record resource interaction based on calendar data and resource interaction data of other users, where the other users are customers of the entity and have provided the system with access to the resource interaction data and calendar data to be used in recreation of the digital renditions.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for generating digital rendition of a third party entity location to recreate a user interaction in a digital ecosystem, the system comprising:
    at least one network communication interface;
    at least one non-transitory storage device; and
    at least one processing device coupled to the at least one non-transitory storage device and the at least one network communication interface, wherein the at least one processing device is configured to:
        receive an input associated with a resource interaction from a user;
        determine a third party entity and the third party entity location associated with the resource interaction;
        determine a timestamp associated with the resource interaction between the user and the third party entity;
        extract one or more audio files of the third party entity and the third party entity location associated with the time stamp of the resource interaction;
        extract one or more video files of the third party entity and the third party entity location associated with the time stamp of the resource interaction;
        instantaneously generate the digital rendition of the third party entity location associated with the time stamp of the resource interaction between the user and the third party entity based on the one or more audio files and the one or more video files in the digital ecosystem; and
        allow the user to recreate a user interaction associated with the resource interaction in the digital ecosystem via the generated digital rendition of the third party entity location.

2. The system of claim 1, wherein the at least one processing device is configured to:
    capture audio associated with the third party entity and the third party entity location to store in the one or more audio files; and capture video associated with the third party entity and the third party entity location to store in the one or more video files.

3. The system of claim 1, wherein the at least one processing device is configured to:
allow the user to identify one or more resources associated with the resource interaction while recreating the user interaction in the digital ecosystem.

4. The system of claim 3, wherein the at least one processing device is configured to:
allow the user to return or exchange at least one resource of the one or more resources in the digital ecosystem after recreation of the user interaction.

5. The system of claim 1, wherein the at least one processing device is configured to:
display additional resources in the digital ecosystem while the user is recreating the user interaction.

6. A computer program product for generating digital rendition of a third party entity location to recreate a user interaction in a digital ecosystem, the computer program product comprising a non-transitory computer-readable storage medium having computer executable instructions for causing a computer processor to perform the steps of:
receiving an input associated with a resource interaction from a user;
determining a third party entity and the third party entity location associated with the resource interaction;
determining a timestamp associated with the resource interaction between the user and the third party entity;
extracting one or more audio files of the third party entity and the third party entity location associated with the time stamp of the resource interaction;
extracting one or more video files of the third party entity and the third party entity location associated with the time stamp of the resource interaction;
instantaneously generating the digital rendition of the third party entity location associated with the time stamp of the resource interaction between the user and the third party entity based on the one or more audio files and the one or more video files in the digital ecosystem; and
allowing the user to recreate a user interaction associated with the resource interaction in the digital ecosystem via the generated digital rendition of the third party entity location.

7. The computer program product of claim 6, wherein the computer executable instructions cause the computer processor to perform the steps of:
capturing audio associated with the third party entity and the third party entity location to store in the one or more audio files; and
capturing video associated with the third party entity and the third party entity location to store in the one or more video files.

8. The computer program product of claim 6, wherein the computer executable instructions cause the computer processor to perform the step of allowing the user to identify one or more resources associated with the resource interaction while recreating the user interaction in the digital ecosystem.

9. The computer program product of claim 8, wherein the computer executable instructions cause the computer processor to perform the step of allowing the user to return or exchange at least one resource of the one or more resources in the digital ecosystem after recreation of the user interaction.

10. The computer program product of claim 6, wherein the computer executable instructions cause the computer processor to perform the step of displaying additional resources in the digital ecosystem while the user is recreating the user interaction.

11. A computer implemented method for generating digital rendition of a location to recreate a user interaction in a digital ecosystem, wherein the method comprises:
receiving an input associated with a resource interaction from a user;
determining a third party entity and a third party entity location associated with the resource interaction;
determining a timestamp associated with the resource interaction between the user and the third party entity;
extracting one or more audio files of the third party entity and the third party entity location associated with the time stamp of the resource interaction;
extracting one or more video files of the third party entity and the third party entity location associated with the time stamp of the resource interaction;
instantaneously generating a digital rendition of the third party entity location associated with the time stamp of the resource interaction between the user and the third party entity based on the one or more audio files and the one or more video files in a digital ecosystem; and
allowing the user to recreate a user interaction associated with the resource interaction in the digital ecosystem via the generated digital rendition of the third party entity location.

12. The computer implemented method of claim 11, wherein the method comprises:
capturing audio associated with the third party entity and the third party entity location to store in the one or more audio files; and
capturing video associated with the third party entity and the third party entity location to store in the one or more video files.

13. The computer implemented method of claim 11, wherein the method further comprises allowing the user to identify one or more resources associated with the resource interaction while recreating the user interaction in the digital ecosystem.

14. The computer implemented method of claim 13, wherein the method further comprises allowing the user to return or exchange at least one resource of the one or more resources in the digital ecosystem after recreation of the user interaction.

* * * * *